US006617538B1

(12) United States Patent
Mahawili

(10) Patent No.: US 6,617,538 B1
(45) Date of Patent: Sep. 9, 2003

(54) ROTATING ARC PLASMA JET AND METHOD OF USE FOR CHEMICAL SYNTHESIS AND CHEMICAL BY-PRODUCTS ABATEMENTS

(76) Inventor: Imad Mahawili, 3731 Oakmont, SE., Grand Rapids, MI (US) 49546

(*) Notice: Subject to any disclaimer, the term of this patent is extended or adjusted under 35 U.S.C. 154(b) by 0 days.

(21) Appl. No.: 10/155,049

(22) Filed: May 24, 2002

Related U.S. Application Data

(63) Continuation of application No. 09/540,225, filed on Mar. 31, 2000, now abandoned.

(51) Int. Cl.[7] .................... B23K 10/00

(52) U.S. Cl. .................... 219/121.36; 219/121.43; 219/121.59; 110/250; 110/346

(58) Field of Search .................... 219/121.37, 121.38, 219/121.41, 121.43, 121.59, 121.51, 75, 121.36; 110/246, 250, 346, 244; 373/18–22; 588/901

(56) References Cited

U.S. PATENT DOCUMENTS

| | | | | |
|---|---|---|---|---|
| 4,226,406 | A | 10/1980 | Frolov et al. | 266/148 |
| 4,574,179 | A | 3/1986 | Masuzawa et al. | 219/121.43 |
| 4,596,718 | A | 6/1986 | Gruner | 427/34 |
| 4,620,080 | A | 10/1986 | Arata et al. | 219/121 |
| 4,625,681 | A | 12/1986 | Sutekiyo | 123/3 |
| 4,644,877 | A | 2/1987 | Barton et al. | 110/250 |
| 4,656,330 | A | 4/1987 | Poole | 219/121 |
| 4,764,906 | A | 8/1988 | Clements et al. | 367/142 |
| 4,770,109 | A | 9/1988 | Schlienger | 110/247 |

(List continued on next page.)

OTHER PUBLICATIONS

Imad Mohammed Hassan Mahawili, "A Study of the Titanium Tetrachloride Oxidation in a Rotating Arc Plasma Jet," Thesis submitted for the Degree of Doctor of Philosophy, University of London, London, 1974.

*Primary Examiner*—Mark Paschall
(74) *Attorney, Agent, or Firm*—Van Dyke, Gardner, Linn & Burkhart, LLP

(57) ABSTRACT

An apparatus for chemical synthesis or chemical abatement is disclosed which includes a processing chamber and a secondary chamber which is in communication with the processing chamber. The processing chamber is configured to generate an arc in the processing chamber. A magnetic field generator, such as an energized coil or permanent magnet, generates a magnetic field in the processing chamber, which induces the arc generated in the processing chamber to rotate. The apparatus further includes at least one injection port for introducing at least one waste medium into the processing chamber and into the rotating arc whereby the rotating arc transforms the waste medium into a plasma resulting in a disassociation of the chemical constituents comprising the waste medium which thereafter flow into the secondary chamber. The secondary chamber is configured to quench the plasma products when the plasma is in the secondary chamber to maintain the disassociation and thereby reduce the reactivity of the chemical constituents thereby abating the waste medium. In other aspects, two or more mediums are introduced into the rotating arc which transforms the mediums into plasma thereby raising the energy of the mediums which causes the plasma products to become associated to thereby form a desired compound. In this aspect, the secondary chamber is configured to quench the associated plasma products when the plasma products are in the secondary chamber to maintain the association and thereby synthesize the desired compound.

49 Claims, 4 Drawing Sheets

U.S. PATENT DOCUMENTS 4,831,944 A 5/1989 Durand et al. .............. 110/346
4,864,097 A 9/1989 Wallner ................. 219/121.52
4,886,001 A 12/1989 Chang et al. ............... 110/346
4,958,767 A 9/1990 Labrot et al. ................. 239/13
5,104,634 A 4/1992 Calcote ...................... 423/446
5,108,718 A 4/1992 Dummersdorf et al. ..................... 422/186.23
5,405,514 A 4/1995 Berman et al. ............. 204/164
5,457,298 A 10/1995 Nelson et al. ......... 219/121.52
5,538,765 A 7/1996 Kurihara et al. ............ 427/577
5,569,397 A 10/1996 Tsurumaki et al. .... 219/121.51
5,704,976 A 1/1998 Snail ........................... 117/98
5,893,985 A 4/1999 Luo et al. .............. 219/121.48
5,961,772 A 10/1999 Selwyn ....................... 156/345
6,101,969 A 8/2000 Niori et al. .............. 118/723 E

ROTATING ARC PLASMA JET AND METHOD OF USE FOR CHEMICAL SYNTHESIS AND CHEMICAL BY-PRODUCTS ABATEMENTS

This application is a continuation application of application Ser. No. 09/540,225, filed on Mar. 31, 2000 now abandoned, by Imad Mahawili, Ph.D, entitled, ROTATING ARC PLASMA JET AND METHOD OF USE FOR CHEMICAL SYNTHESIS AND CHEMICAL BY-PRODUCTS ABATEMENTS, which is incorporated by reference herein in its entirety.

TECHNICAL FIELD AND BACKGROUND OF THE INVENTION

The present application generally relates to an apparatus for synthesizing compounds and, more particularly, to an apparatus that can synthesize compounds and, further, be used as an abatement process for harmful and toxic waste.

It has long been recognized that chemical synthesis can be achieved by opening a given chemical bond in one or more molecules to allow the recombination of such molecules into new compounds. This opening has been typically achieved by heating molecules under pressure or by the use of catalysts. Heating under pressure, however, requires special equipment, such as a pressurized reaction vessel. Catalysts on the other hand often create undesirable or toxic by-products, which must then be disposed of or destroyed.

Typical chemical abatement processes similarly involve heating but at much higher temperatures. In high temperature incineration, the toxic chemicals are heated to temperatures typically on the order of about 1000° C. or greater. However, even with these extreme temperatures, not all the chemicals are destroyed which may result in discharge of the residual toxic substances into the environment. Other methods of chemical abatement include the use of landfills, but great care must be taken to avoid contamination of ground water in the region of the land fill. However, neither of these processes are preferred for destroying gaseous waste products, such as produced in the microelectronics industry, because residual toxin gases may escape into the environment.

More and more processes produce toxic by-products. For example, in the semiconductor fabrication industry, effluent streams of nitrogen, freons, fluorinated carbons, silanes, and the like are produced. As previously noted, however, high temperature incineration is not suitable for gaseous waste products as incineration does not necessarily eliminate the toxic by-products completely. With dwindling available land fills and concerns for the environment, this increase in production of hazardous waste is becoming a national and global problem.

Consequently, there is a need for simpler chemical synthesis and chemical abatement processes.

SUMMARY OF THE INVENTION

Accordingly, the present invention provides for an apparatus which uses a rotating arc for either chemical synthesis or chemical abatement.

In one form of the invention, a chemical abatement apparatus includes a processing chamber and a secondary chamber which is in communication with the processing chamber. The processing chamber is configured to generate an arc in the processing chamber. A magnetic field generator selectively generates a magnetic field in the processing chamber, which induces the arc generated in the processing chamber to rotate. The apparatus further includes at least one injection port for introducing at least one waste medium into the processing chamber and into the rotating arc whereby the rotating arc transforms the chemical constituents in a plasma and disassociates the chemical constituents comprising the waste medium into a non-toxic form which thereafter flows into the secondary chamber. The secondary chamber is configured to quench the plasma when the plasma is in the secondary chamber to maintain the disassociation and thereby reduce the reactivity of the chemical constituents.

In one aspect, the apparatus includes a second injection port for introducing a quenching medium into the secondary chamber to quench the plasma. For example, the second injection port is preferably adapted to inject water or water vapor into the secondary chamber. Preferably, the secondary chamber includes a plurality of the second injection ports.

In other aspects, the magnetic field generator comprises a coil which extends around at least a portion of the processing chamber. Preferably, the magnetic field generated by the coil has sufficient magnitude to rotate the arc to form a solid plasma disc. Alternately, a permanent magnet can be used to generate the magnetic field.

In yet other aspects, the apparatus includes an anode and a cathode which are positioned in the processing chamber and which are configured to generate the arc therebetween.

In further aspects, the processing chamber includes a third injection port and a cathode housing which extends around the cathode. The third injection port is used to inject an inert gas between the cathode and the cathode housing to form a sheath around the cathode which protects the cathode from reactants in the processing chamber from reacting with the cathode.

In another form of the invention, a chemical synthesis apparatus includes a processing chamber and a secondary chamber which is in communication with the processing chamber. The processing chamber is configured to generate an arc in the processing chamber. A magnetic field generator selectively generates a magnetic field in the processing chamber which induces the arc in the processing chamber to rotate. The apparatus further includes at least one injection port for injecting at least two mediums into the processing chamber and into the rotating arc whereby the rotating arc transforms the mediums into plasma whereby the elements comprising each medium are energized to a more reactive state and consequently associate to form a desire compound. The compound, thereafter, flows into the secondary chamber, which is configured to quench the compound when the compound is in the secondary chamber to stabilize the compound.

In other aspects, the secondary chamber includes an expanded portion to permit the molecules forming the compound to expand thereby further stabilizing the compound. Preferably, the compound is quenched when the medium enters the expanded portion of the secondary chamber.

According to yet another form of the invention, a method of chemical abatement includes generating a rotating arc, exposing a waste medium to the rotating arc to disassociate the chemical constituents of the waste medium into a non-toxic form, and quenching the chemical constituents in the non-toxic form to stabilize the disassociated state of the chemical constituents.

In one aspect, the method of chemical abatement further includes expanding the disassociated chemical constituents in their non-toxic form to further stabilize the chemical constituents. For example, expanding may include directing the chemical constituents into a chamber with an expanded portion.

In other aspects, quenching includes exposing the chemical constituents in their non-toxic form to one of water and water vapor. Preferably, the chemical constituents are expanded and quenched substantially simultaneously.

In yet another form of the invention, a method of chemical synthesis includes generating a rotating arc exposing at least two medium to the rotating arc to energize the mediums to a more reactive state whereby the mediums associate to form a chemical compound. The chemical compound then quenched to stabilize the chemical compound in its existing form.

In this manner, the present invention provides for a method and apparatus in which a rotating arc can be used to energize elements for forming compounds therefrom or to energize chemical constituents of a waste compound to cleave the bonds between the chemical constituents to form non-toxic constituents. The resulting compound or non-toxic constituents are then stabilized in their respective forms by quenching.

These and other objects, advantages, purposes and features of the invention will be apparent to one skilled in the art from a study of the following description taken in conjunction with the drawings.

DETAILED DESCRIPTION OF THE DRAWINGS

DETAILED DESCRIPTION OF THE PREFERRED EMBODIMENTS

Figure 1:
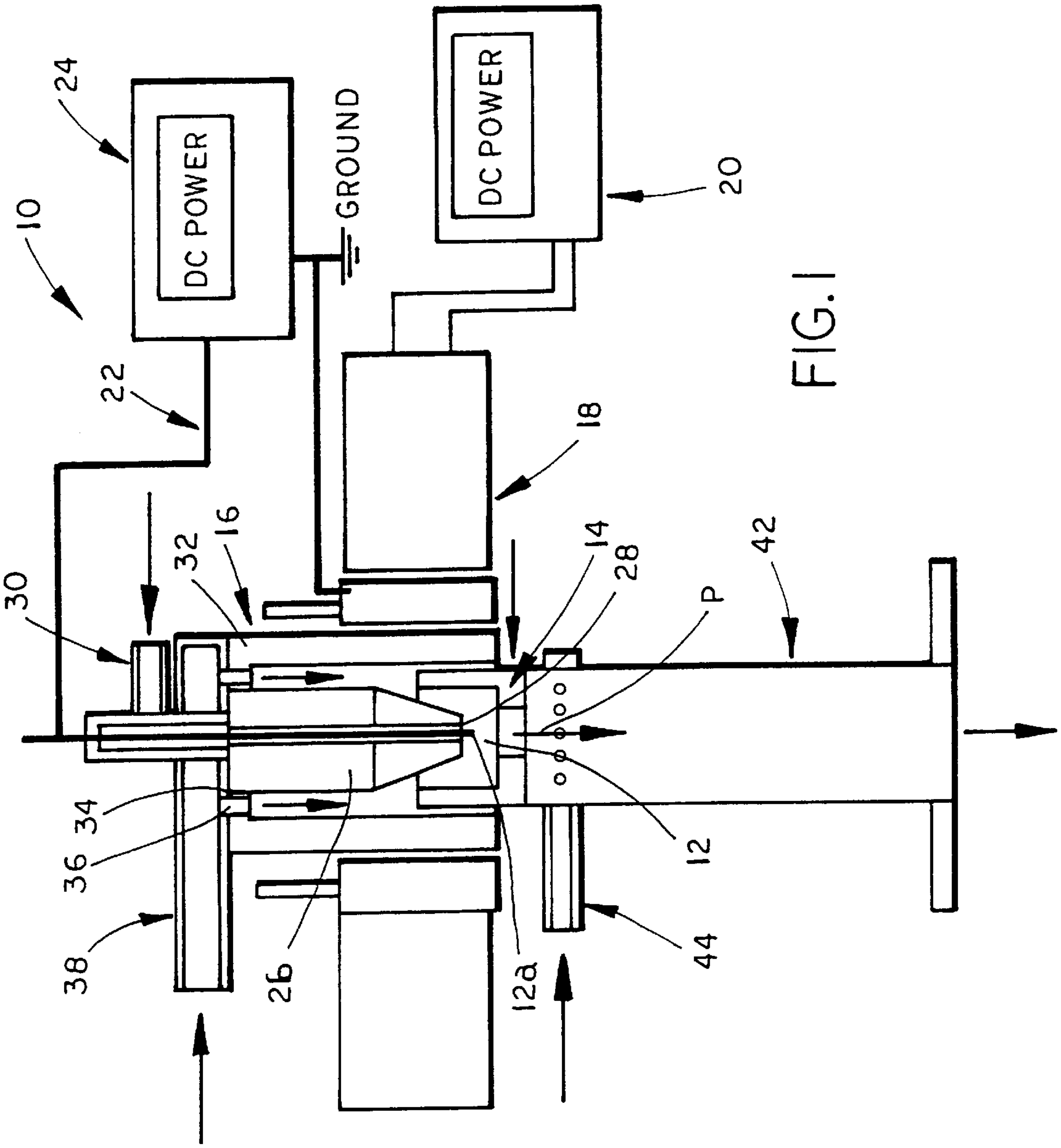
FIG. 1 is a schematic representation of the apparatus of the present invention.

Referring to FIG. 1, the numeral 10 generally designates an apparatus of the present invention which can be used for chemical synthesis or chemical abatement processes. As will be more fully described, apparatus 10 includes a processing chamber 16, which is configured to generate a rotating arc in the chamber, and a secondary chamber 42 which is in communication with processing chamber 16 which is configured to post-quench the chemical or chemicals which enter the secondary chamber after the chemical or chemicals have been exposed to the rotating arc in the processing chamber, which stabilizes the resulting chemical or chemicals. For example, apparatus 10 is particularly suitable for forming compounds such as titanium dioxide from oxygen and titanium tetrachloride or for waste abatement of perfluorinated compounds (PFC), such as carbon tetrachloride or freons, and converting them into elemental products, like flourine, carbon, and hydrogen.

As best seen in FIG. 1, processing chamber 16 includes a cathode 12 and an anode 14 which are preferably housed in processing chamber 16. Cathode 12 preferably comprises a high temperature conducting material, such tungsten, carbon, or the like. Anode 14 comprises a high thermal conductivity material, such as copper, graphite or the like. In addition, anode 14 preferably comprises a water cooled anode, for example a water cooled copper anode. A discharge arc between cathode 12 and anode 14 is generated or powered by a circuit 22 which includes a second power source 24, preferably a DC power source. The arc power supply preferably contains a high frequency starter and when the power is supplied a high-pressure horizontal stationary arc discharge starts between the cathode and the anode.

The discharge arc is rotated by a magnetic field produced by a magnetic field coil 18. Preferably, the magnetic field is produced at the center of the cathode and in a vertical orientation. Coil 18 extends around processing chamber 16 and is preferably a copper coil, and most preferably shielded copper wire, with turns in a range of 100 to 10,000 turns, more preferably, 500 to 3,000 turns and, most preferably, 1,000 to 2,000 turns. Magnetic field coil 18 generates the magnetic field in the processing chamber 16 when energized by a power source 20, preferably a DC power source. When electric power is applied to cathode 12 and anode 14.and current is applied to magnetic field coil 18, the interaction between the arc current between cathode 12 and anode 14 and the magnetic field manifests itself in the motion of the arc around cathode 12. The frequency of the rotation of the arc is a function of the magnitudes of both the magnetic field and the arc current. The preferred frequency of rotation of the arc is a range of 50 to 3,000 hertz, more preferably, in a range of 200 to 2,000 Hz, and most preferably in a range of about 500 to 1,000 hertz. Preferably, the magnetic field, which is generated at the center of the cathode causes the arc discharge to rotate horizontally. As the current of the magnetic field coil is increased, the arc spins faster and faster until it starts to run into its own wake. At this point, the arc discharge is best represented by a solid plasma disc.

Cathode 12 preferably has a pointed tip 12*a* to enable the concentration of the applied electric field and extends through a cathode housing 26, preferably an insulated metal housing, into processing chamber 16. An annulus passage 28 is formed between cathode 12 and housing 26 through which an inert gas stream is injected, such as argon or nitrogen, in order to form an inert gas sheath around cathode 12. An inert gas stream, for example, of argon or nitrogen, is injected inside the cathode annulus. The sheath of the inert gas helps in cooling cathode 12 and, furthermore, protects cathode 12 from chemical attack when reactants are present in processing chamber 16. The inert gas is injected into annular passage 28 through an inlet 30 which is in fluid communication with passage 28.

Processing chamber 16 preferably includes a cylindrical wall 32, preferably a copper wall, and an upper wall 34 which includes an annular distribution ring 36 through which one or more mediums are injected into processing chamber 16 from a second feed input port 38. In the present embodiment, the injected medium may comprise waste gases, liquid waste, solid waste, and a combination of liquid, solid, and gaseous products. Furthermore, second feed input port 38 may comprise two or more input ports to inject two or more feed streams of different mediums that can be premixed after their injection into processing chamber 16 and, preferably, before reaching the rotating arc generated between cathode 12 and anode 14. For example, two or more mediums may be injected when synthesizing compounds, for example the mediums may include elements or simple compounds that are injected to form a more complex compound.

When a waste medium is injected into the processing chamber 16, as will be more fully described below, the medium is heated by the plasma uniformly and with minimal arc by-pass and the rotating arc cleaves the bonds between the elements or simple compounds forming the toxic compounds of the waste medium. Arc by-pass of reactant streams is common in linear non-rotating plasma jets, which results in low rate of conversion due to the high degree of non-uniformity.

In this application the term synthesis means a process or reaction for building up a compound from two or more simpler compounds or elements. Abatement as used herein means a decrease in amount of a substance or compound, for example by breaking up the elements or simple compounds that form a more complex compound.

A feed input 38 is provided at the top of processing chamber to provide a gravity feed of the medium, whether liquid, gas, solids, or a mixture thereof into processing chamber 16. It should be understood that medium may also be injected under pressure into processing chamber 16. When the medium, whether it is a combination of elements or compounds or a single compound, such as a waste medium, is injected through inlet port 38, the medium encounters the rotating arc which results in a rotating arc plasma jet which moves into chamber 42 as indicated by the arrow P in FIG. 1. Preferably, as noted above, the magnetic field and the arc between cathode 12 and anode 14 are of sufficient magnitude to create a solid plasma disc—in other words, the arc rotates at such a speed that it runs in its own wake. In this manner, the temperature of the medium as it encounters the arc is more uniformly distributed across the medium. It should be understood that the frequency of the rotation of the arc can be varied by varying the arc current and/or the magnetic field flux.

Anode 14 is connected to chamber 42 and represents the mixing stage. This mixing stage can be used to feed oxygenated compounds, hydrogen containing compounds or chilled water with an acidic or basic constitution depending on the required treatment of the plasma jet products. In the illustrated embodiment, secondary chamber 42 comprises a straight tube weldment, preferably with one or more injection ports or nozzles 44 and, most preferably, with an annular distribution ring with many nozzles. As will be described in reference the second embodiment, the secondary chamber may comprise a self-expanding De Laval nozzle with direct or annular second feed stream.

When the medium is injected into apparatus 10 through inlet port 38 and the medium encounters the rotating arc, the elements forming the medium are energized and leave anode 14 as plasma jet P (FIG. 1.) which discharges into or enters second chamber 42. As noted above, chamber 42 includes one or more injection nozzles 44. In preferred form, nozzles 44 are used to inject a quenching medium into chamber 42. Preferably, the quenching medium comprises a water or a water vapor. In this manner, when the plasma jet is in chamber 42, the quenching medium reduces the temperature of the plasma jet products in chamber 42, which reduces the reactivity of the products thus leaving the products in their existing state. The resulting product is then discharged from chamber 42 for further optional processing, such as an acid or alkali wash.

Figure 2:
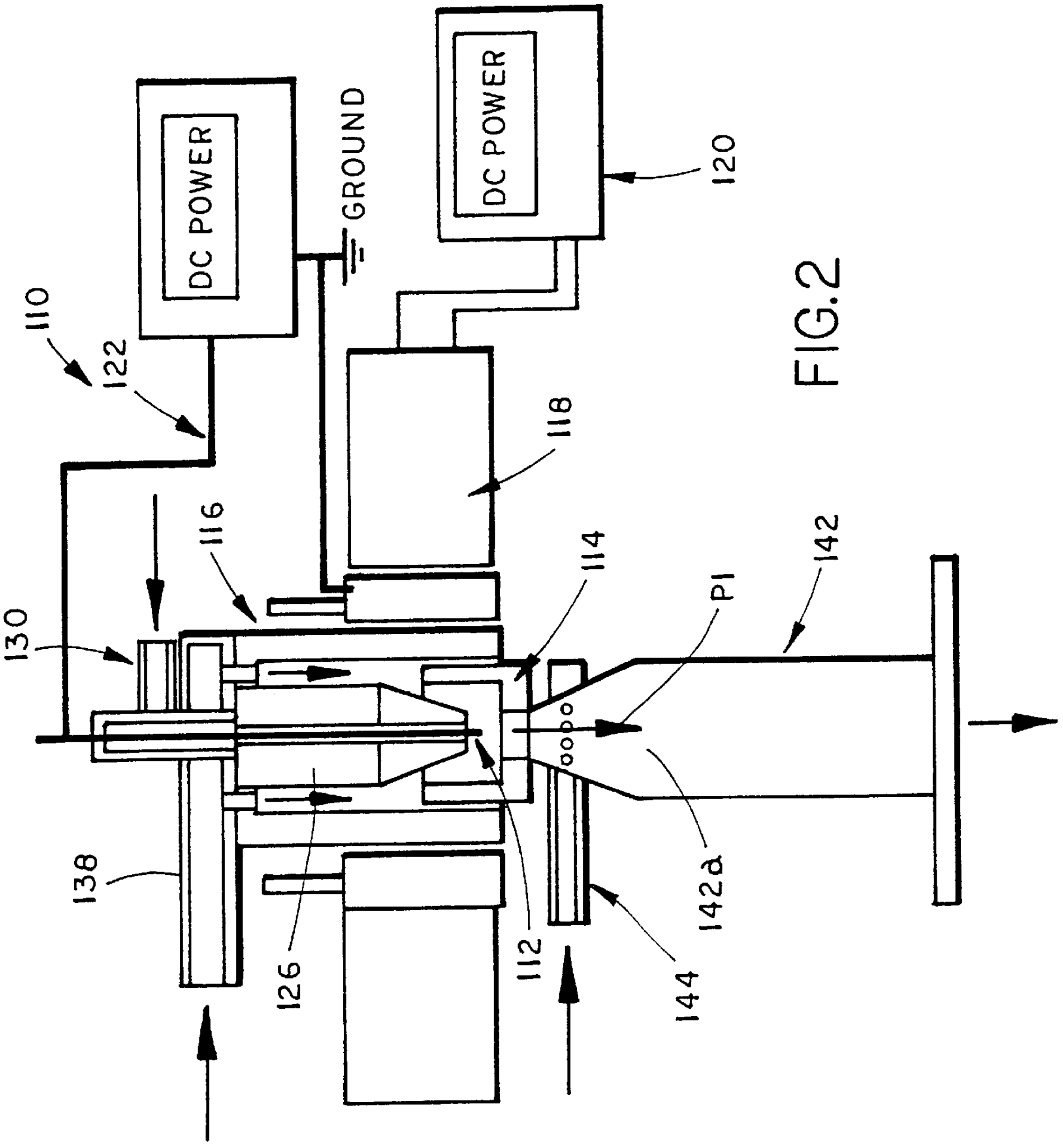
FIG. 2 is a schematic representation of a second embodiment of the apparatus of the present invention.

Referring to FIG. 2, a second embodiment 110 of the apparatus of the present invention is illustrated. Apparatus 110 is of similar construction to apparatus 10 and includes processing chamber 116 and a cathode 112 and an anode 114, which are housed in processing 116. Similar to the previous embodiment, an arc between cathode 112 and anode 114 is generated by a circuit 122. The arc is rotated by a magnetic field generated by a magnetic field coil 118 which extends around processing chamber 116. Magnetic field coil 118 is energized by power source 120, similar to the previous embodiment.

Apparatus 110 also similarly includes a feed input port 130 for injecting inert gas between cathode 112 and cathode housing 126 and a second feed input port 138 for injecting one or more mediums into the arc produced between cathode 112 and anode 114, similar to the previous embodiment. Thus when magnetic field coil 118 is energized and the arc is generated between cathode 112 and anode 114, the arc rotates. As described in reference to the first embodiment, when the medium or mediums encounter the rotating arc, the elements or compounds forming the medium are energized such that they either combine to form a compound or separate to produce separate elements, such as elemental gases which are non-harmful. In other words, when the medium or mediums encounter the rotating arc, the enthalpy of the medium or mediums is increased such they are transformed into a plasma jet P1 (FIG. 2) in which the chemical constituents comprising the medium are energized to either react with other chemical constituents within the plasma jet or they separate to form simpler compounds or elements. In the illustrated embodiment, plasma jets P1 enters a secondary chamber, which defines a mixing stage and preferably includes an expansion nozzle or a De Laval nozzle 142. Expansion nozzle 142 includes at least one feed input or nozzle 144 for introducing or injecting a quenching medium into the expansion portion **142*a* of expansion nozzle 142. Thus, immediately after the medium encounters the rotating arc, the plasma jet produced thereby encounters a quenching medium, which is delivered through feed nozzle 144**, and further preferably undergoes expansion due to the expansion nozzle. As a result, the plasma products are stabilized in their existing form.

This expansion and quenching is performed to reduce the reactivity of the plasma products. Preferably, the expansion and quenching is substantially simultaneous. In addition, the expansion nozzle preferably includes an expansion section in a range of 27 degrees to 30 degrees and, more preferably, approximately 30 degrees. In this manner, when waste material is injected into apparatus 110 the waste material instantaneously decomposes under the influence of the arc and then, further, expands in the expansion nozzle where it is preferably turned into a water-soluble form by the introduction of the quenching medium through inlet or inlets 144 suitable for disposal using conventional non-toxic waste treatment processes.

Figure 3:
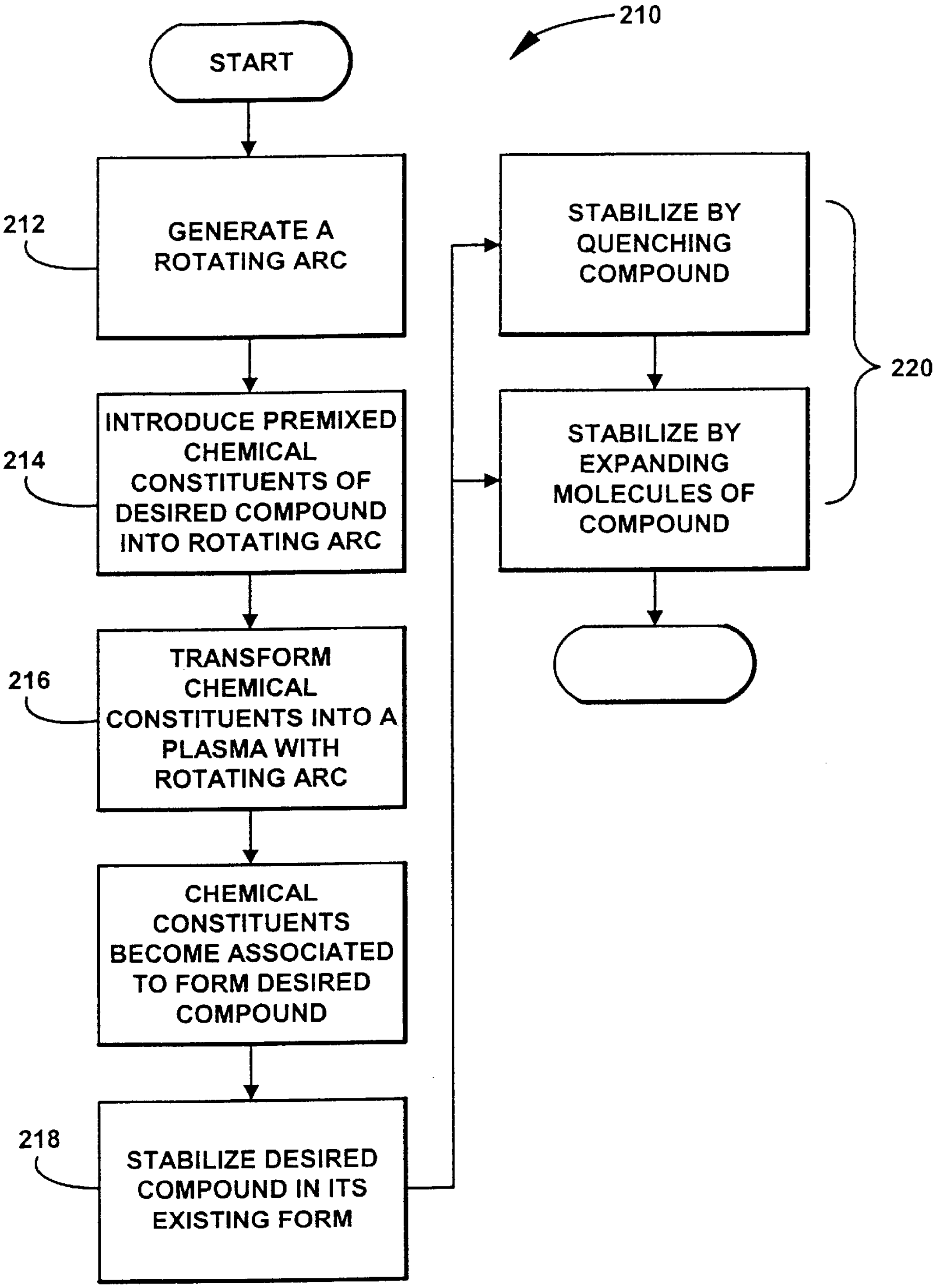
FIG. 3 is a flow chart of a chemical synthesis process of the present invention.

Referring to FIG. 3, the chemical synthesis process of the present invention 210 includes generating an arc and rotating the arc in a processing chamber 212, such as processing chamber 16 or 116. At least two mediums, such as a gas, liquid, or solid or combination thereof, is injected in the processing chamber (214). Preferably, the mediums are mixed before reaching the rotating arc. When the mediums encounter the rotating arc (216), the mediums are transformed into a plasma jet in which the chemical constituents of the mediums are energized so that they are in a more reactive state. Since these reactive chemical constituents are mixed and, preferably, uniformly heated, they will combine to the desired compound. In other words, the chemical constituents forming the mediums are associated as the desired compound. However, in order to stabilize the new association of these plasma products, the plasma products are cooled or quenched (218) using a quenching medium such as water, water vapor or the like. In preferred form, the reactivity of the plasma products is further reduced or simultaneously reduced by expanding the associated chemical constituents (220), which further stabilizes their association.

The present invention, therefore, provides a method in which reactants are heated by a rotating arc to a plasma state to form a plasma jet, which raises the energy level of the chemical constituents of the respective medium such that the chemical constituents are reactive to form the desired compound. The introduction of the quenching medium reduces the temperature in the associated chemical constituents, now in the form of the desired compound, to reduce the likelihood of disassociation of the chemical constituents forming the compound. For example, the present invention is particularly useful for forming titanium dioxide. Unlike the prior art devices, the energized chemicals are quenched out of the field of the magnetic coil in order to yield the desired compound.

Figure 4:
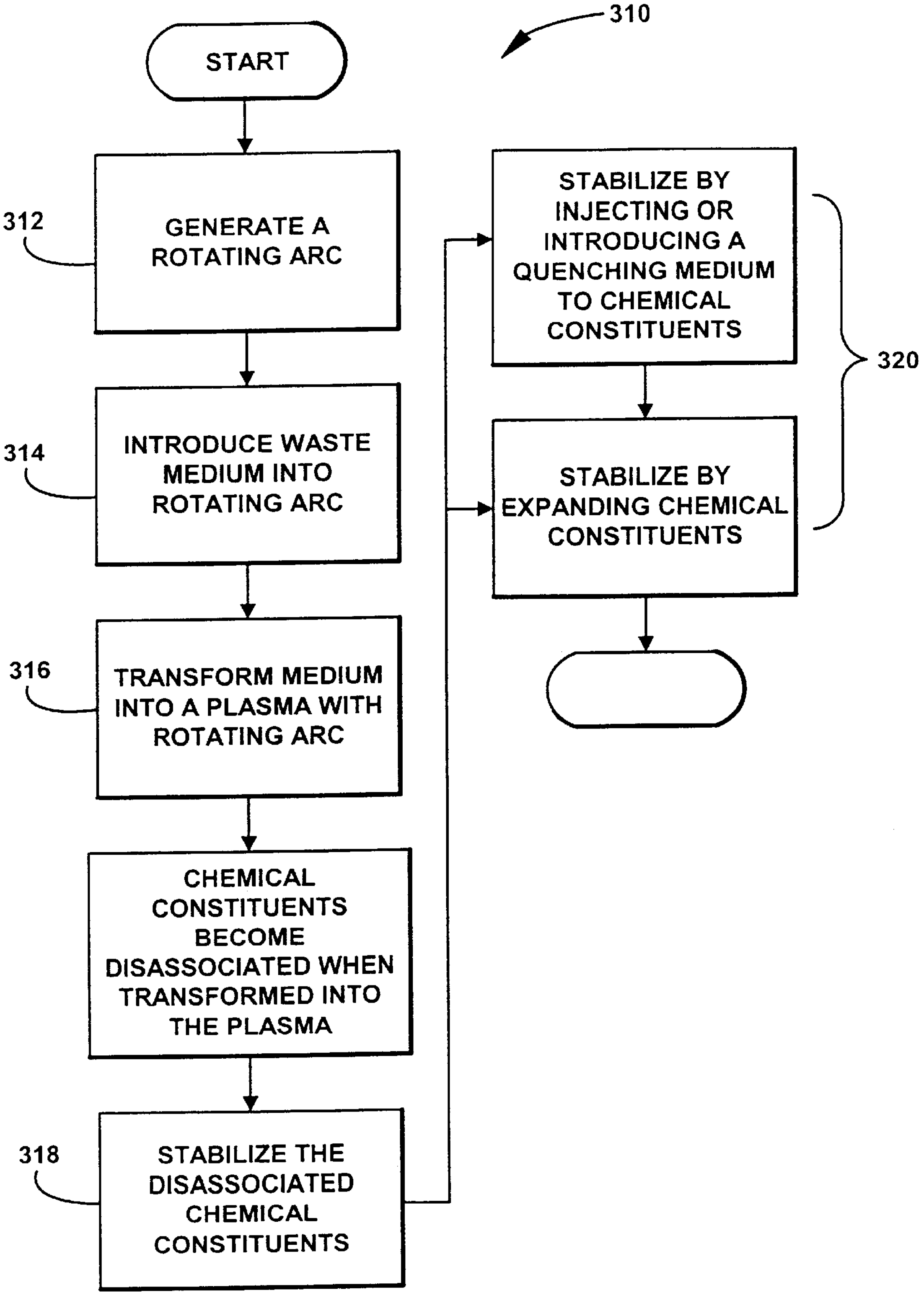
FIG. 4 is a flow chart of a chemical abatement of the present invention.

Referring to FIG. 4, the chemical abatement process (310) of the present invention includes generating an arc and rotating the arc (312) in a processing chamber, such as processing chamber 16 or 116. A waste medium, such as a waste gas, liquid, or solid or combination thereof, is injected (314) in the processing chamber so that the waste medium will encounter (316) the rotating arc. By encountering the rotating arc, the waste medium is transformed into a plasma jet in which the bonds between the chemical constituents, such as compounds or elements, forming the waste medium are cleaved or broken such that the resulting products are no longer toxic or harmful. In other words, the chemical constituents forming the waste medium are disassociated. However, in order to reduce the reactivity of the plasma products and maintain or stabilize this disassociation, the plasma products are cooled or quenched (318) using a quenching medium such as water, water vapor or the like. In preferred form, the reactivity of the plasma products is further reduced or simultaneously reduced by expanding (320) the disassociated chemical constituents, which further stabilizes their disassociation. The present invention is particularly used for the effluent streams produced in semiconductor etching, which typically include nitrogen, freons, fluorinated carbons, silanes, CF4, or the like.

It can be appreciated that the apparatus of the present invention can be used for chemical synthesis of compounds and also for the abatement of harmful and toxic waste. While only one example of a chemical compound that can be synthesized using the present apparatus and process has been described, numerous other compounds can be similarly processed using the present process and apparatus. Examples of toxic wastes which can be abated using the present apparatus and process are similarly numerous. As described, toxic waste can be input into the feed stream of the present system and completely converted into active elemental reaction products immediately after which these reaction products can be (a) oxidized further to stabilize these harmless products by mixing them with oxygenated gas to produce stable products, (b) reduced by mixing them with a hydrogen donor reducing compound to produce the desired stable product or (c) immediately quenched using water or an alkaline water solution scrubbed by pure water or an alkaline water solution. The final output from the system, in this case, is then directed to a treatment plant for acid or base neutralization. When the reactant gases flow around the cathode and encounter the rotating arc, the gases are transformed into a plasma gas which increases the reactivity of the gas. As a result, the reactant gas is injected into the plasma system or energized to a state that permits the reactant gases to combine to form the desired compound. Once combined, the compound is then quenched by the introduction of the quenching medium.

While several forms of the invention have been shown and described, other forms will now be apparent to those skilled in the art. For example, water can be introduced into the processing chamber along with the reactant mediums or waste medium. Additionally, a permanent magnet can be used in lieu of coils to generate the magnetic field. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

I claim:

1. A chemical abatement apparatus comprising:

a processing chamber configured to generate an arc therein;

a secondary chamber in communication with said processing chamber;

a magnetic field generator selectively generating a magnetic field in said processing chamber, said magnetic field inducing said arc to rotate in said processing chamber;

at least one first injection port, said injection port for introducing at least one waste medium into said processing chamber and into said rotating arc whereby said rotating arc disassociates the chemical constituents comprising the waste medium into a non-toxic form and transforms the chemical constituents into a plasma, the plasma thereafter flowing into said secondary chamber; and said secondary chamber configured to expand and quench the plasma substantially simultaneously when said plasma is in said secondary chamber to maintain the disassociation and thereby reduce the reactivity of the chemical constituents.

2. The chemical abatement apparatus according to claim 1, further comprising a second injection port for introducing a quenching medium into said secondary chamber to quench the plasma.

3. The chemical abatement apparatus according to claim 2, wherein said second injection port is adapted to inject water into said secondary chamber.

4. The chemical abatement apparatus according to claim 2, wherein said second injection port is adapted to inject water vapor into said secondary chamber.

5. The chemical abatement apparatus according to claim 2, wherein said secondary chamber includes a plurality of said second injection port.

6. The chemical abatement apparatus according to claim 1, wherein said processing chamber includes a plurality of said first injection port.

7. The chemical abatement apparatus according to claim 1, wherein said magnetic field generator comprises a coil extending around at least a portion of said processing chamber.

8. The chemical abatement apparatus according to claim 1, wherein said magnetic generator generates a magnetic field having sufficient magnitude to rotate said arc to form a solid plasma disc.

9. The chemical abatement apparatus according to claim 1, further comprising:

an anode positioned in said processing chamber; and a cathode positioned in said processing chamber, said anode and said cathode being configured to generate said arc therebetween.

10. The chemical abatement apparatus according to claim 9, wherein said processing chamber includes a third injection port and a cathode housing around said cathode, said third injection port for injecting an inert gas between said cathode and said cathode housing to form a sheath around said cathode, said sheath protecting said cathode from reactants in said processing chamber reacting with said cathode.

11. The chemical abatement apparatus according to claim 1, wherein said processing chamber includes an outlet, and said secondary chamber includes an expanded portion at said outlet to permit the chemical constituents in said plasma to expand to thereby disassociate the chemical constituents and thereby further reduce the reactivity of the chemical constituents.

12. A chemical synthesis apparatus comprising:

a processing chamber configured to generate an arc therein;

a secondary chamber in communication with said processing chamber;

a magnetic field generator selectively generating a magnetic field in said processing chamber, said magnetic field inducing said arc to rotate in said processing chamber;

at least one injection port, said injection port for injecting at least two mediums into said processing chamber and into said rotating arc whereby said rotating arc transforms said mediums into plasma whereby the elements comprising each medium are energized to a more reactive state and consequently associate to form a desired compound, said compound thereafter flowing into said secondary chamber; and said secondary chamber configured to expand and quench said compound when said compound flows into said secondary chamber to stabilize said compound.

13. The chemical synthesis apparatus according to claim 12, further comprising a second injection port for injecting a quenching medium into said secondary chamber to quench said compound.

14. The chemical synthesis apparatus according to claim 13, wherein said second injection port is adapted to inject one of water and water vapor into said secondary chamber.

15. The chemical synthesis apparatus according to claim 14, wherein said secondary chamber includes a plurality of said second injection port.

16. The chemical synthesis apparatus according to claim 12, wherein said processing chamber includes a plurality of said first injection ports, said first injection ports forming an injection ring around said cathode.

17. The chemical synthesis apparatus according to claim 12, wherein said magnetic generator comprises a coil extending around at least a portion of said processing chamber.

18. The chemical synthesis apparatus according to claim 17, wherein said magnetic generator generates a magnetic field having sufficient magnitude to rotate said arc to form a solid plasma disc.

19. The chemical synthesis apparatus according to claim 12, further comprising:

an anode positioned in said processing chamber; and a cathode positioned in said processing chamber, said anode and said cathode configured to generate said arc therebetween.

20. The chemical synthesis apparatus according to claim 19, wherein said processing chamber includes a third injection port and a cathode housing around said cathode, said third injection port for injecting an inert gas between said cathode and said cathode housing to form a sheath around said cathode, said sheath protecting said cathode from reactants in said processing chamber reacting with said cathode.

21. The chemical synthesis apparatus according to claim 12, wherein said secondary chamber includes an expanded portion to permit the molecules forming said compound to expand and thereby stabilizing the compound.

22. The chemical synthesis apparatus according to claim 21, said second injection port injecting said quenching medium into said expanded portion.

23. A chemical processing apparatus comprising:

a processing chamber;

a secondary chamber in communication with said processing chamber;

an anode positioned in said processing chamber;

a cathode positioned in said processing chamber, said anode and said cathode generating an arc therebetween when coupled to a power source;

a magnetic field generator selectively generating a magnetic field in said processing chamber, said magnetic field inducing said arc to rotate in said processing chamber;

at least one injection port, said injection port for injecting at least one medium into said processing chamber and into said rotating arc whereby said rotating arc transforms said medium into plasma whereby the chemical constituents comprising said medium are energized and become disassociated, the chemical constituents thereafter flowing into said secondary chamber; and said secondary chamber including an expanded portion at an outlet of said processing chamber and a second injection port for injecting a quenching medium into said secondary chamber to quench said chemical constituents when said plasma is in said expanded portion to reduce the temperature of said chemical constituents substantially simultaneously with expansion of the chemical constituents, said expanded portion increasing the volume of said chemical constituents thereby further reducing the temperature of the chemical constituents to stabilize the chemical constituents in their disassociated state.

24. The chemical processing apparatus according to claim 23, wherein said expanded portion is adjacent said processing chamber.

25. A chemical processing apparatus comprising:

a processing chamber;

a secondary chamber in communication with said processing chamber;

an anode positioned in said processing chamber;

a cathode positioned in said processing chamber, said anode and said cathode generating an arc therebetween when coupled to a power source;

a magnetic field generator selectively generating a magnetic field in said processing chamber, said magnetic field inducing said arc to rotate in said processing chamber;

at least one injection port, said injection port for injecting at least one medium into said processing chamber and into said rotating arc whereby said rotating arc transforms said medium into plasma whereby the chemical constituents comprising said medium are energized and become disassociated, the chemical constituents thereafter flowing into said secondary chamber; and said secondary chamber including an expanded portion and a second injection port for injecting a quenching medium into said secondary chamber to quench said chemical constituents when said plasma is in said secondary chamber to reduce the temperature of said chemical constituents, said expanded portion being adjacent said processing chamber and increasing the volume of said chemical constituents thereby further reducing the temperature of the chemical constituents to stabilize the chemical constituents in their disassociated state, wherein said second injection port injects into said expanded portion.

26. The chemical processing apparatus according to claim 25, wherein said second injection port injects one of water and water vapor into said secondary chamber.

27. A method of chemical abatement comprising the steps of:

generating a rotating arc;

exposing a waste medium to the rotating arc to disassociate the chemical constituents of the waste medium into a non-toxic form; and quenching the chemical constituents in the non-toxic form to stabilize the disassociated state of the chemical constituents.

28. The method of chemical abatement according to claim 27, further comprising expanding the disassociated chemical constituents in their non-toxic form to further stabilize the chemical constituents in their non-toxic form.

29. The method of chemical abatement according to claim 28, wherein said expanding includes directing the chemical constituents in their non-toxic form into a chamber with an expanded portion.

30. The method of chemical abatement according to claim 27, wherein said quenching includes exposing the chemical constituents in their non-toxic form to one of water and water vapor.

31. The method of chemical abatement according to claim 30, wherein said exposing includes injecting one of water and water vapor into the chemical constituents in their non-toxic form.

32. The method of chemical abatement according to claim 30, wherein said expanding and said quenching are substantially simultaneous.

33. The method of chemical abatement according to claim 27, wherein said exposing includes injecting the waste medium into the rotating arc.

34. The method of chemical synthesis comprising the steps of:

generating a rotating arc;

exposing at least two mediums to the rotating arc to energize the mediums to a more reactive state whereby the mediums associate to form a chemical compound; and quenching the chemical compound to stabilize the chemical compound in its existing form.

35. The method of chemical synthesis according to claim 34, further comprising expanding the molecules of the chemical compound to further stabilize the chemical compound.

36. The method of chemical synthesis according to claim 35, wherein said expanding and said quenching are substantially simultaneous.

37. The method of chemical synthesis according to claim 34, wherein said quenching includes injecting one of water and water vapor into the molecules forming the compound to stabilize the chemical compound.

38. The method of chemical synthesis according to claim 34, wherein said exposing includes injecting said mediums into the rotating arc.

39. The chemical abatement apparatus according to claim 1, wherein said secondary chamber includes a tapered nozzle at an outlet of said processing chamber to thereby expand the chemical constituents when the chemical constituents flow into said secondary chamber.

40. The chemical abatement apparatus according to claim 39, wherein said tapered nozzle has a taper in a range of 27° to 30°.

41. The chemical syntheses apparatus according to claim 21, wherein said expanded portion comprises a tapered nozzle.

42. The chemical syntheses apparatus according to claim 41, wherein said tapered nozzle includes a taper in a range of 27° to 30°.

43. A chemical processing apparatus comprising:

a processing chamber configured to generate a solid plasma disc;

a secondary chamber in communication with said processing chamber;

at least one injection port for introducing one chosen from (a) at least one waste medium into said processing chamber and into said plasma disc whereby said plasma disc disassociates the chemical constituents comprising the waste medium into a non-toxic form and transforms the chemical constituents into a plasma, the plasma thereafter flowing into said secondary chamber and (b) at least two mediums into said processing chamber and into said solid plasma disc whereby said solid plasma disc transforms said mediums into plasma whereby the elements comprising each medium are energized to a more reactive state and consequently associate to form a desired compound, said compound thereafter flowing into said secondary chamber; and said secondary chamber configured to expand and quench the plasma substantially simultaneously when the plasma is in said secondary chamber.

44. The chemical processing apparatus according to claim 43, further comprising:

an anode positioned in said processing chamber; and a cathode positioned in said processing chamber, said anode and said cathode being configured to generate an arc therebetween, and said processing chamber configured to rotate said arc to form said solid plasma disc.

45. The chemical processing apparatus according to claim 44, further comprising a magnetic generator generating a magnetic field having sufficient magnitude to rotate said arc to form said solid plasma disc.

46. The chemical processing apparatus according to claim 43, further comprising a second injection port for introducing a quenching medium into said secondary chamber to quench one of (a) the plasma and (b) the compound.

47. The chemical processing apparatus according to claim 46, wherein said second injection port is adapted to inject one of (a) water and (b) water vapor into said secondary chamber.

48. The chemical processing apparatus according to claim 43, wherein said processing chamber includes an outlet, and said secondary chamber includes an expanded port at said outlet to permit one of (a) the chemical constituents in said plasma to expand to thereby disassociate the chemical constituents and, thereby, further reduce the reactivity of the chemical constituents and (b) to increase the volume of the molecules forming the compound thereby stabilizing the compound.

49. The chemical processing apparatus according to claim 48, wherein said secondary chamber includes a tapered nozzle at said outlet of said processing chamber to thereby expand the plasma when the plasma flows into said secondary chamber.

* * * * *

UNITED STATES PATENT AND TRADEMARK OFFICE

CERTIFICATE OF CORRECTION

PATENT NO. : 6,617,538 B1 Page 1 of 1
APPLICATION NO. : 10/155049
DATED : September 9, 2003
INVENTOR(S) : Imad Mahawili It is certified that error appears in the above-identified patent and that said Letters Patent is hereby corrected as shown below:

Column 4:
Line 17, Delete --.-- after "14".

Signed and Sealed this

Twenty-second Day of August, 2006

JON W. DUDAS
*Director of the United States Patent and Trademark Office*